United States Patent
Isomura et al.

(10) Patent No.: US 7,860,408 B2
(45) Date of Patent: Dec. 28, 2010

(54) INTERFEROMETER FOR DEMODULATING DIFFERENTIAL M-PHASE SHIFT KEYING SIGNAL

(75) Inventors: Akihiko Isomura, Kawasaki (JP); Jens Rasmussen, Kawasaki (JP); Takafumi Terahara, Kawasaki (JP); Kentaro Nakamura, Kawasaki (JP); Takeshi Hoshida, Kawasaki (JP); George Ishikawa, Kawasaki (JP); Hiroshi Onaka, Kawasaki (JP); Morio Wada, Tokyo (JP); Hiroyuki Matsuura, Tokyo (JP); Akira Miura, Tokyo (JP); Yasuyuki Suzuki, Tokyo (JP); Hideaki Arai, Hitachi (JP); Satoshi Takasugi, Hitachi (JP)

(73) Assignees: Fujitsu Limited, Kawasaki (JP); Yokogawa Electric Corporation, Tokyo (JP); Hitachi Cable Ltd., Tokyo (JP)

( * ) Notice: Subject to any disclaimer, the term of this patent is extended or adjusted under 35 U.S.C. 154(b) by 844 days.

(21) Appl. No.: 11/651,591

(22) Filed: Jan. 10, 2007

(65) Prior Publication Data

US 2007/0177151 A1  Aug. 2, 2007

(30) Foreign Application Priority Data

Jan. 27, 2006  (JP) .............................. 2006-019607

(51) Int. Cl.
*H04B 10/06* (2006.01)
(52) U.S. Cl. ....................... 398/212; 398/214; 359/288; 385/14
(58) Field of Classification Search ................. 398/212, 398/214; 359/288; 385/14
See application file for complete search history.

(56) References Cited

U.S. PATENT DOCUMENTS

| 5,359,412 | A | 10/1994 | Schulz |
| 6,522,812 | B1 * | 2/2003 | Nikonov .................. 385/37 |

(Continued)

FOREIGN PATENT DOCUMENTS

JP   02-096719   4/1990

(Continued)

OTHER PUBLICATIONS

R.A. Griffin and A.C. Carter, Optical Differential Quadrature Phase-Shift key (oDQPSK) for High Capacity Optical Transmission; 2002.

(Continued)

*Primary Examiner*—Nathan M Curs
(74) *Attorney, Agent, or Firm*—Staas & Halsey LLP

(57) ABSTRACT

An interferometer for demodulating a differential M-phase shift keying signal includes a PLC type interferometer main body, a heating portion that heats the PLC type interferometer main body, and an intermediate member having a higher stiffness than that of the PLC type interferometer main body, for bonding the PLC type interferometer main body and the heating portion with each other while being sandwiched therebetween. A linear expansion coefficient difference between the PLC type interferometer main body and the intermediate member is equal to or smaller than $4.5 \times 10^{-6}/^\circ$ C., and a thermal conductivity difference between the PLC type interferometer main body and the intermediate member is equal to or larger than 10 W/mK. A phase of an optical signal flowing through the interferometer is adjusted by using the heating portion and a second heating portion.

2 Claims, 11 Drawing Sheets

U.S. PATENT DOCUMENTS

| | | | |
|---|---|---|---|
| 6,603,916 B1 * | 8/2003 | McGreer et al. | 385/129 |
| 2006/0056845 A1 * | 3/2006 | Parsons et al. | 398/41 |
| 2007/0110369 A1 * | 5/2007 | Blauvelt et al. | 385/50 |
| 2007/0275254 A1 * | 11/2007 | Nagata | 428/447 |

FOREIGN PATENT DOCUMENTS

| | | |
|---|---|---|
| JP | 2001-217443 | 8/2001 |
| JP | 2004-516743 A | 6/2004 |
| WO | 02/51041 A2 | 6/2002 |
| WO | WO 03/063515 | 7/2003 |

OTHER PUBLICATIONS

Japanese Patent Office Notice of Reason for Rejection mailed May 18, 2010, in corresponding Japanese Patent Application No. 2006-019607.

* cited by examiner

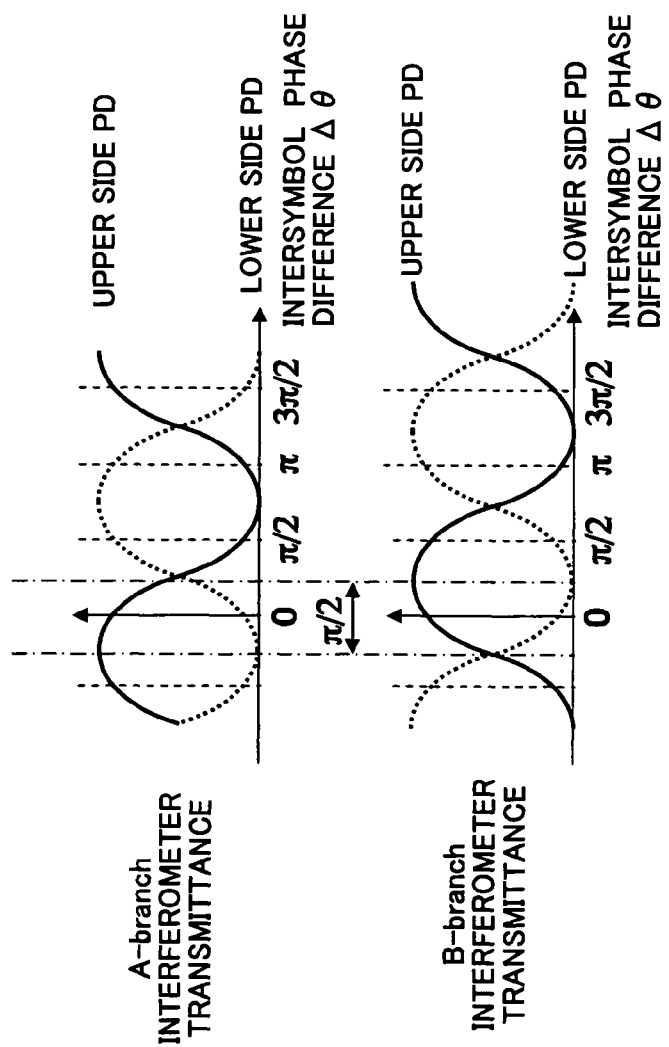

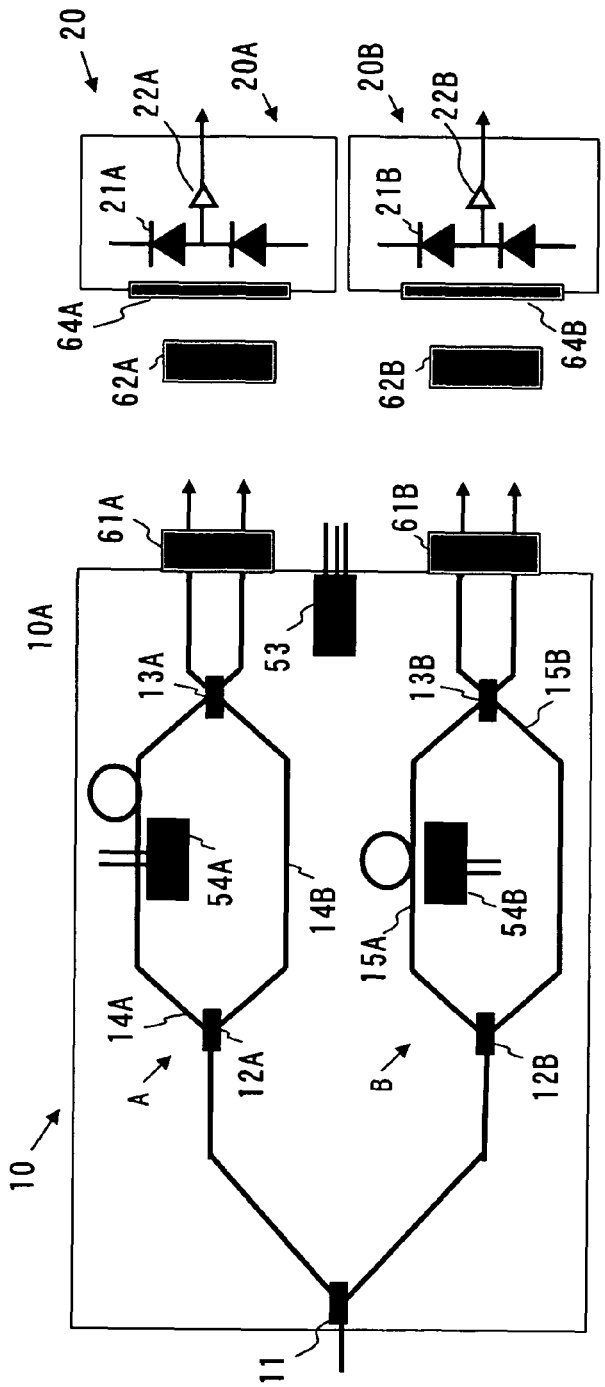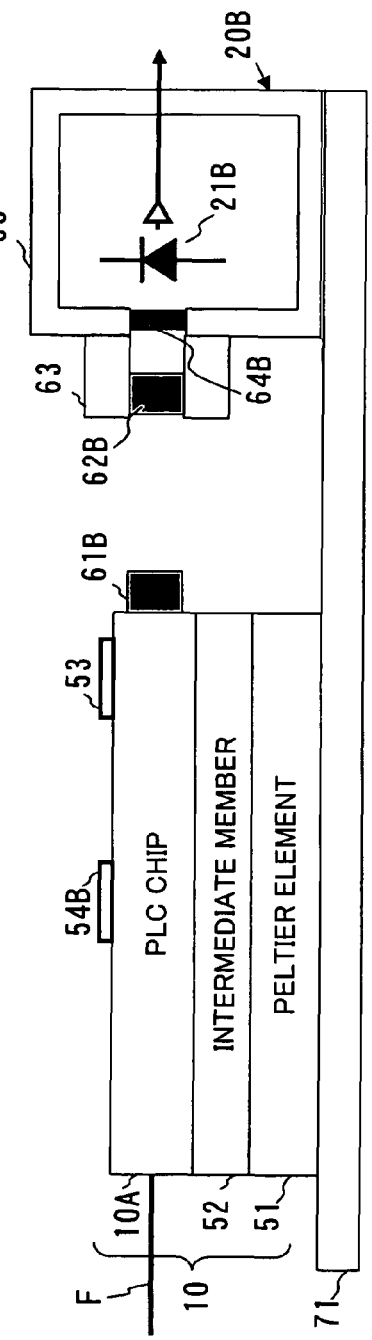
FIG. 3A
FIG. 3B

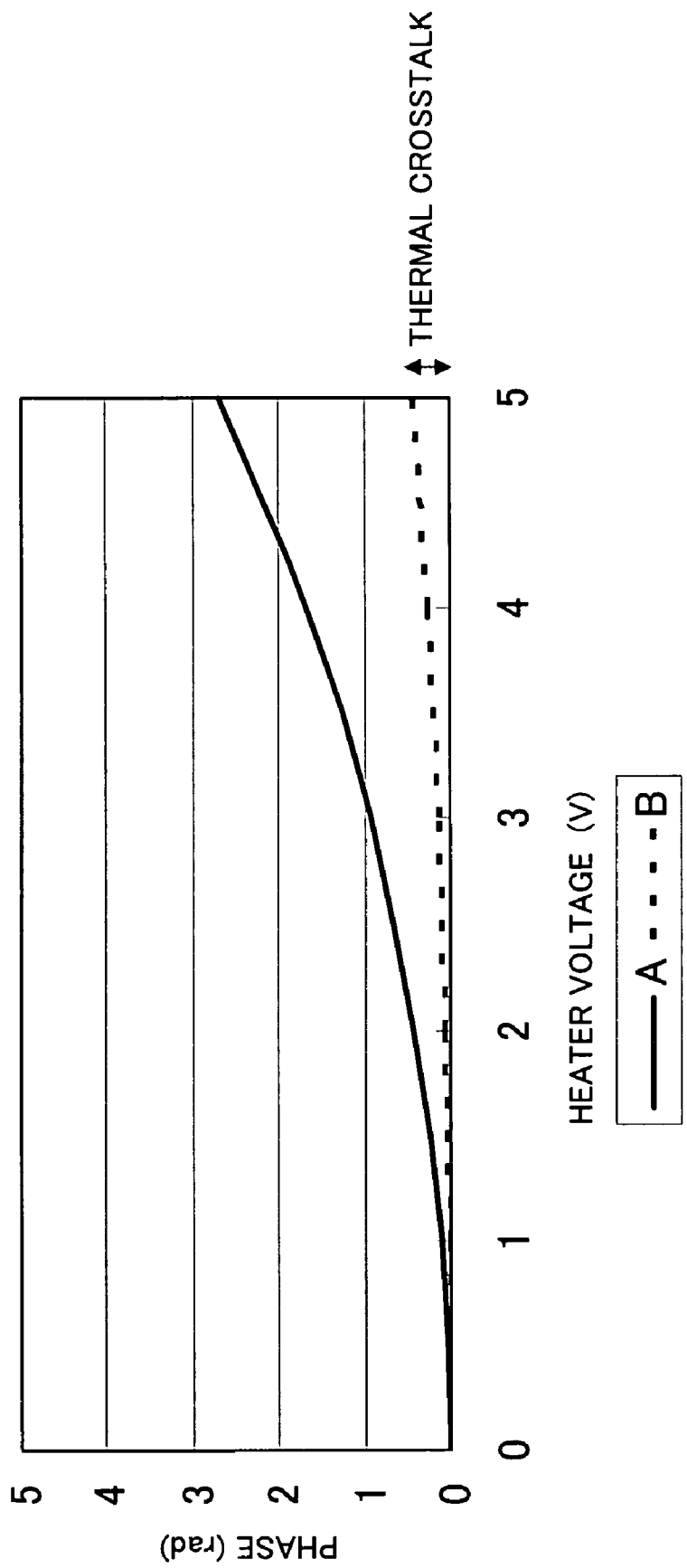

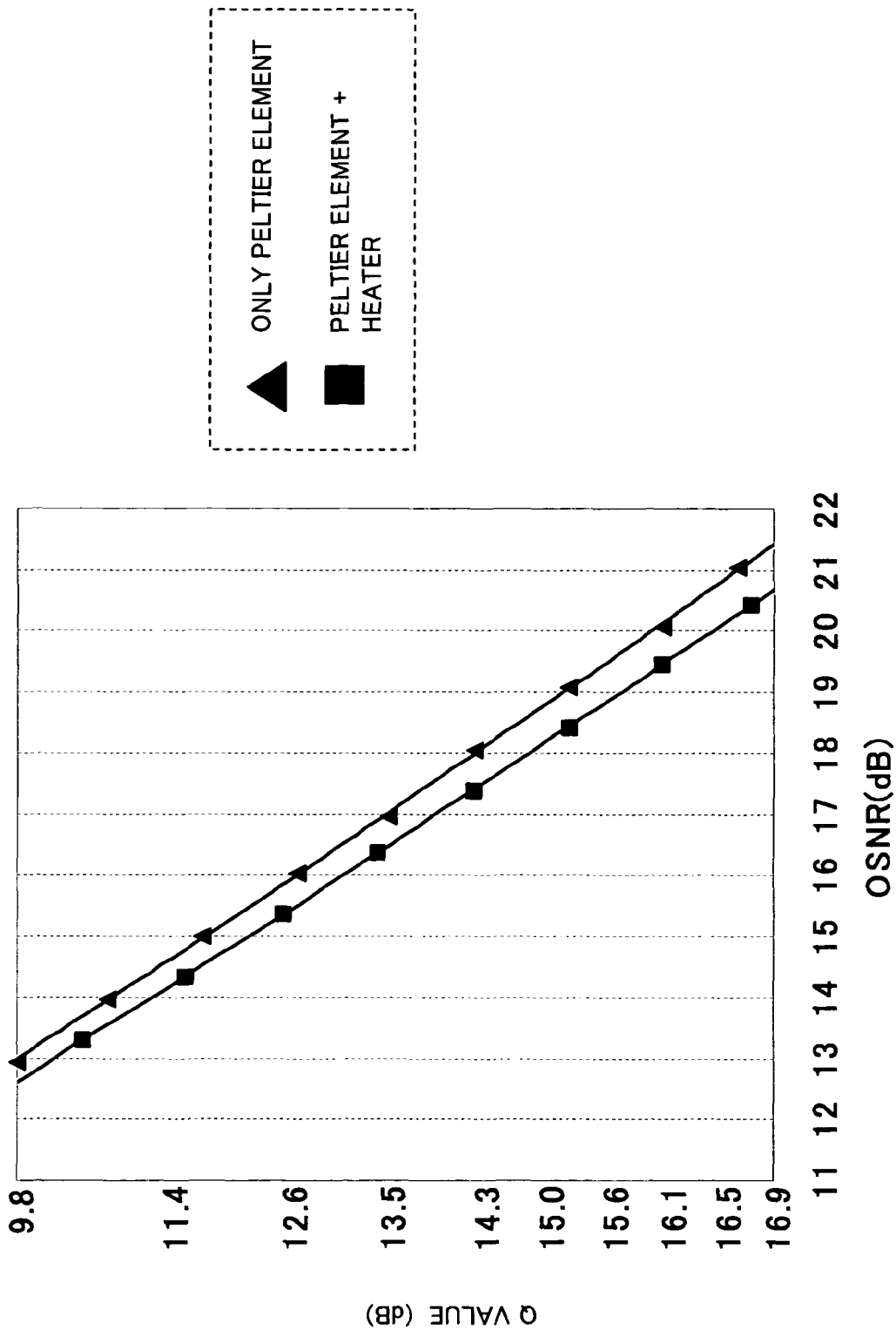

INTERFEROMETER FOR DEMODULATING DIFFERENTIAL M-PHASE SHIFT KEYING SIGNAL

BACKGROUND OF THE INVENTION

1. Field of the Invention

The present invention relates to a structure of an optical interferometer in a receiver, and a controlling method thereof with respect to an optical transmission system of a phase shift keying scheme such as a differential M (M=2n (n is a natural number)) phase shift keying (for example, differential quadrature phase shift keying (DQPSK)) scheme.

2. Description of the Related Art

In recent years, the capacity of an optical communication system has been increased rapidly. However, a keying technique which becomes mainstream remains a binary amplitude shift keying (which is also called on-off keying (OOK)) in a non return-to-zero (NRZ) or return-to-zero (RZ) format. Recently, a keying/demodulation technique such as a duobinary scheme, carrier-suppressed return-to-zero (CSRZ), or differential phase shift keying (DPSK) is utilized in optical communications. In the DPSK, information is carried based on a phase change between two symbols adjacent to each other. In binary DPSK, the phase change is limited to "0" or "p". A scheme based on four phase changes (0, p/2, p, and 3p/2) is called DQPSK. As compared with conventional OOK, the DPSK obtains an improved optical S/N ratio (optical signal-to-noise ratio (OSNR)) gain of approximately 3 dB, and a tolerance to a non-linear effect. In optical DQPSK, four-value symbols are transmitted, so spectral efficiency can be doubled. In other words, this is a scheme for simultaneously transmitting two digital signals whose phases are modulated, based on signal light having a single frequency. In this scheme, a pulse repetition rate (for example, 20 Gbaud) is half a transmission data rate (for example, 40 Gbit/s). Therefore, a signal spectral width becomes half compared with a conventional NRZ keying scheme or the like. Thus, the requirement to a speed of an electrical device, the adjustment of light dispersion, and polarization mode dispersion are reduced. That is, the optical DQPSK is a promising candidate for a next-generation optical communication system.

A typical optical DQPSK receiver includes a pair of Mach-Zehnder interferometers corresponding to two branches (here A-branch and B-branch) (see, for example, Non-Patent document 1). Each of the Mach-Zehnder interferometers includes two arms. One of the arms has an optical delay element t corresponding to a symbol time in a transmission system. For example, an optical phase difference between the arms of the interferometer is set to "p/4" in the A-branch and set to "−p/4" in the B-branch.

Two output terminals of each of the Mach-Zehnder interferometers are connected with a balanced photo detector for reproducing transmitted data. Note that a structure and an operation of optical DQPSK transmitter/receiver are described in, for example, Patent document 1.

In the optical DQPSK receiver, it is very important that the optical phase difference between the arms of the interferometer is accurately set to "p/4" and "−p/4". Otherwise, a deterioration occurs in optical S/N ratio which exceeds an allowable range. Here, a delay interferometer such as the Mach-Zehnder interferometer is a filter whose transmission characteristic is periodic. A transmission period of the delay interferometer is called a free spectral range (FSR).

When the amount of phase between the arms is shifted from p/4 (or −p/4) by physical characteristics of the delay interferometer, a temporal change in set temperature, a change of a signal light wavelength, or the like, there is a problem in that a received waveform deteriorates to reduce a code error rate. Therefore, it is necessary to provide a mechanism for continuously monitoring the amount of phase p/4 (or −p/4) and canceling a shift by feedback control when the amount of phase is shifted therefrom. The amount of phase is adjusted by controlling a temperature of a part of the interferometer by using a heater.

[Patent document 1] JP 2004-516743 A (WO 2002/051041, US 2004/008147)

[Non-Patent document 1] "Optical Differential Quadrature Phase-Shift Key (oDQPSK) for High Capacity Optical Transmission" by R. A. Griffin et al, Optical Fiber Communication Conference and Exhibit, 2002. OFC2002 17-22 Mar. 2002 Pages 367-368

[Patent document 2] JP 2001-217443 A

When the phase is adjusted (for example, changed from 0 to 2 p) by using only the heater, power consumption becomes larger. On the other hand, in a case of control using only temperature control means such as a Peltier element, it is difficult to finely adjust the phase, so a penalty is caused by the shift from an optimum point. The interferometer has wavelength dependence, so it is necessary to suppress polarization dependence. The wavelength dependence is caused by the influence of external stress on a planar lightwave circuit (PLC) included in the interferometer. Even in a case where a waveguide is produced without distortion during a manufacturing process, when the PLC is heated at the time of control, the external stress is applied to the PLC. Therefore, the waveguide is distorted, so polarization wavelength dependence occurs. When the wavelength characteristic of the free spectral range (FSR) of the delay interferometer has the polarization dependence, the FSR from the point of view of an optical signal is changed depending on a state of an input polarization to the interferometer. A shift of the FSR which is caused by the polarization dependence of the wavelength characteristic of the interferometer is called a polarization dependent frequency (PDF). In a case where the optimum point (for example, p/4 (or −p/4) between optical signal wavelengths of two signals) in the interferometer is set in a polarization state, when different polarization states are incident on the interferometer, the shift from the optimum point occurs. Thus, when the optical signals are demodulated, waveforms thereof deteriorate.

FIG. 1 is a graph showing a relationship between a phase error and a Q penalty. FIG. 1 shows the Q penalty in a case where the phase error is shifted from p/4 as a reference. For example, when it is shifted from p/4 by 6 degrees, the penalty of 1 dB occurs. For example, assuming that the FSR is 21.5 GHz, when the penalty of 0.15 dB occurs when the PDF is 0.06 GHz, and the penalty of 1 dB occurs when the PDF is 0.36 GHz. In a case of fiber touch or the like, a transmitted polarized wave varies on a millisecond time scale. On the other hand, the phase adjustment of the interferometer is performed by temperature control, so the control remains on a second time scale. Therefore, it is difficult to correct the shift of the optimum phase point due to the variation of the polarized wave by the phase adjustment of the interferometer. Thus, the interferometer having no polarization dependence (PDF Polarization Dependent Frequency) is required.

SUMMARY OF THE INVENTION

An object of the present invention is to provide an interferometer for demodulating a differential M-phase shift keying signal, which is capable of suppressing an increase in PDF in the interferometer.

In addition, an object of the present invention is to provide an interferometer for demodulating a differential M-phase shift keying signal, which is capable of reducing a manufacturing cost.

The present invention employs the following means to solve the problem.

That is, according to aspects of the present invention, there is provided an interferometer for demodulating a differential M-phase shift keying signal, including:

a planar lightwave circuit (PLC) type interferometer main body;

a heating portion for heating the PLC type interferometer main body; and an intermediate member which has a higher stiffness than that of the PLC type interferometer main body and is bonded to the PLC type interferometer main body and the heating portion while being sandwiched between the PLC type interferometer main body and the heating portion.

According to the present invention, the PLC type interferometer main body is bonded to an intermediate member having a higher stiffness than that thereof. Heat is transferred from a heating portion through the intermediate member. With the structure, the PLC type interferometer main body is prevented from being deforming, thereby suppressing the increase in PDF.

Preferably, in the interferometer according to the present invention, the intermediate member satisfies a condition in which a linear expansion coefficient difference with the PLC type interferometer main body is equal to or smaller than $4.5 \times 10^{-6}/°C$., and a thermal conductivity difference with the PLC type interferometer main body is equal to or larger than 10 W/mK.

Preferably, the interferometer according to the present invention further includes a second heating portion located adjacent to an optical waveguide included in the PLC type interferometer main body.

Preferably, in the interferometer according to the present invention, phase adjustment of the differential M-phase shift keying signal flowing through the PLC type interferometer main body is performed by a temperature control using the heating portion and phase adjustment finer than that made by using the heating portion is performed by a temperature control using the second heating portion.

Further, according to the aspects of the present invention, there is provided a device for demodulating a differential M-phase shift keying signal, including:

an interferometer module in which the differential M-phase shift keying signal is inputted;

a light reception module for receiving optical output signals from the interferometer; and an optical system located between the interferometer module and the light reception module, for coupling the optical output signals with the light reception module, the optical system includes a lens which is attached to an end surface of the interferometer module from which the optical output signals are exited, the two optical output signals from the interferometer module being incident on the lens.

According to the present invention, it is possible to suppress the increase in PDF in the interferometer.

Further, according to the present invention, it is possible to provide the interferometer for demodulating the differential M-phase shift keying signal, which is capable of reducing the manufacturing cost.

BRIEF DESCRIPTION OF THE DRAWINGS

FIG. 2C is a diagram showing FSRs of an A-branch and a B-branch;

FIG. 2D is a table showing a relationship between an intersymbol phase difference $\Delta\theta$ and each of currents (A-branch current and B-branch current) outputted from CDR circuits;

FIG. 3A is an explanatory plan diagram showing an interferometer module and a light reception module;

FIG. 3B is an explanatory side diagram showing the interferometer module and the light reception module shown in FIG. 3A;

FIG. 8 is a graph showing a thermal crosstalk to an adjacent interferometer in a case where a heater temperature is increased while a current applied to the Peltier element is held constant;

FIG. 10 is a graph showing a penalty (Q value) in a case of phase adjustment using only the Peltier element and a penalty in a case of phase adjustment using the Peltier element and a heater.

DETAILED DESCRIPTION OF THE PREFERRED EMBODIMENT

Hereinafter, an embodiment of the present invention will be described with reference to the accompanying drawings. A structure in the embodiment is an example and thus the present invention is not limited to the structure in the embodiment.

Figure 1:
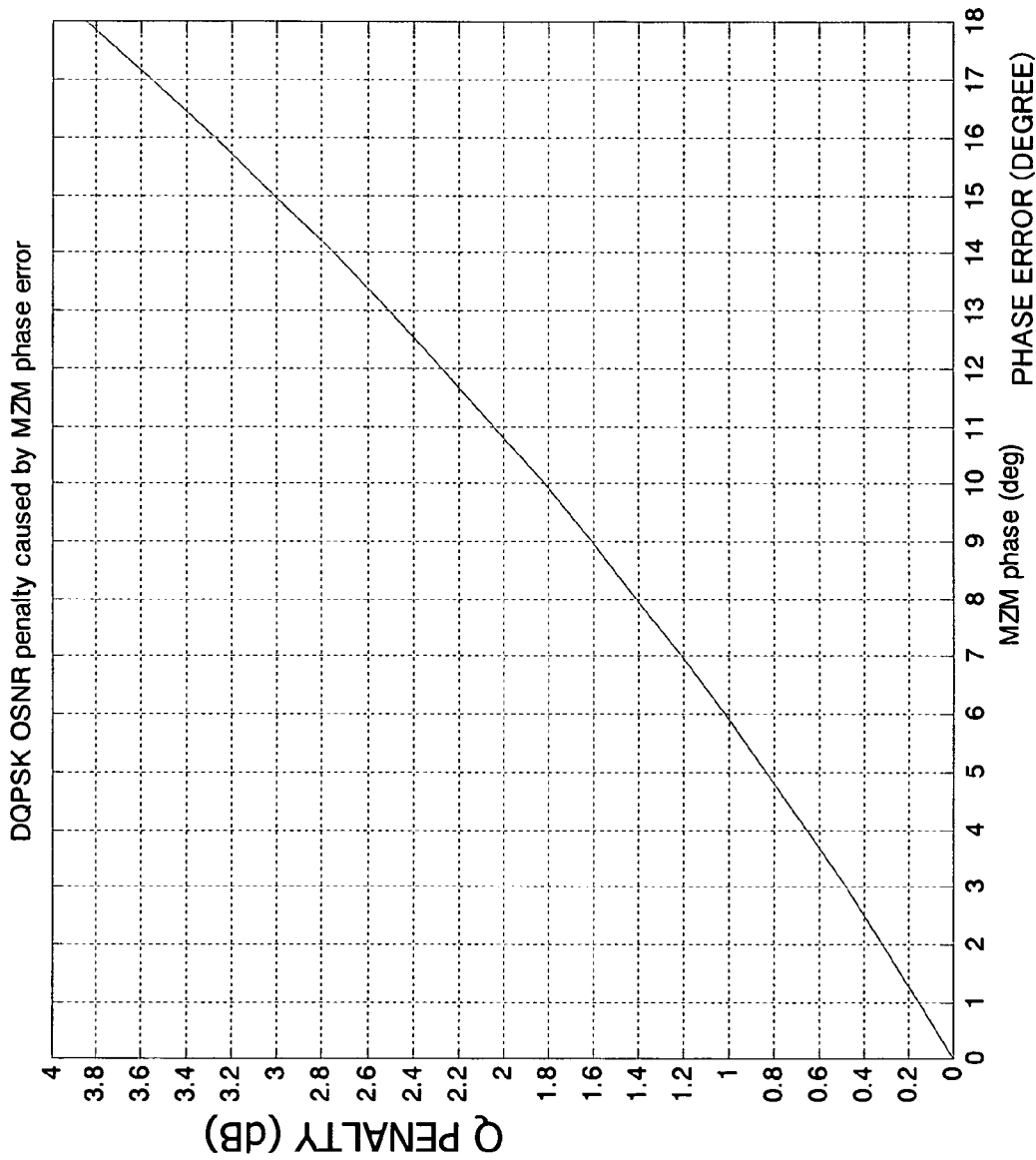
FIG. 1 is a graph showing a relationship between a phase error and a Q penalty.
Figure 2A:
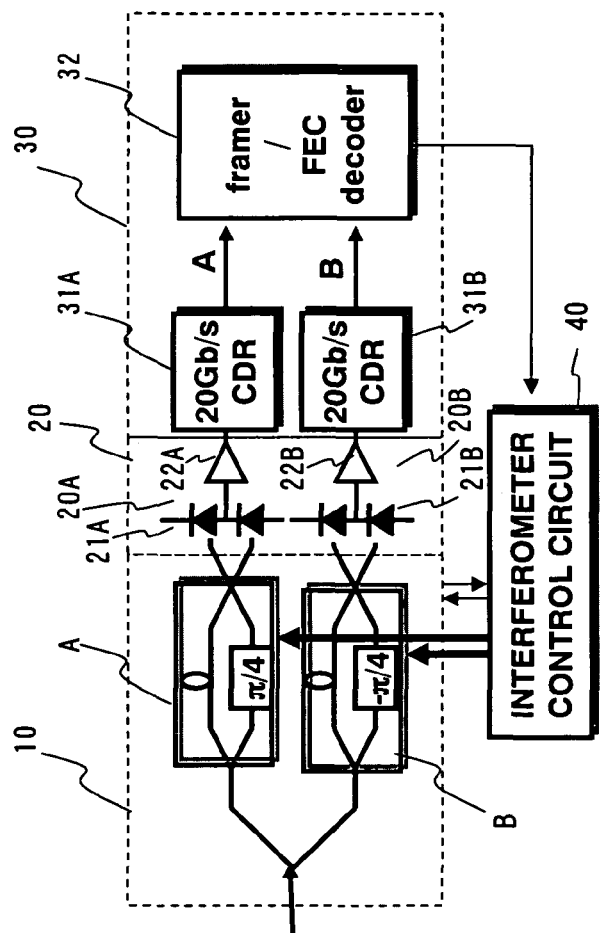
FIG. 2A is a diagram showing a structural example of a DQPSK receiver (DQPSK modulator)

FIG. 2A is a diagram showing a structural example of a DQPSK receiver (DQPSK demodulation device). The DQPSK receiver includes an interferometer module 10, a light reception module (balanced photo detector) 20, a demodulation section 30, and an interferometer control circuit (control section) 40.

The interferometer module 10 includes two systems of delay interferometers (for example, Mach-Zehnder interferometers) into which a received DQPSK modulation signal is inputted. The DQPSK modulation signal is demodulated by the respective delay interferometers "A" and "B" to optical signals whose intensities are modulated, thereby obtaining complementary two signals.

The light reception module 20 includes an A-side light reception module 20A and a B-side light reception module 20B which correspond to the respective interferometers "A" and "B". Hereinafter, the interferometer "A" side may also be referred to as an "A-branch", and the interferometer "B" side may also be referred to as a "B-branch".

The A-side light reception module 20A includes: a photoelectric conversion section 21A having a pair of photo detectors (PD, (for example, Twin-Photo Diodes)) for differentially receiving optical signals (complementary two signals whose intensities are modulated) from two output ports of the interferometer "A"; and an amplifier (trance impedance amplifier (TIA)) 22A for amplifying a difference between outputs of the photoelectric conversion section 21A. The B-side light reception module 20B includes a photoelectric conversion section 21B and an amplifier 22B which correspond to the interferometer "B" as in a case of the A-side light reception module 20A.

The demodulation section (reproduction section) 30 includes: clock data recovery (CDR) circuits 31A and 31B corresponding to the A-branch and the B-branch, for receiving output signals from the respective amplifiers 22A and 22B, and performing clock and data waveform shaping based on the received signals; and a framer/forward error correction (FEC) decoder 32 for receiving output signals from the CDR circuits 31A and 31B and reproducing data through frame cutout and error code correction processing.

Figure 2B:
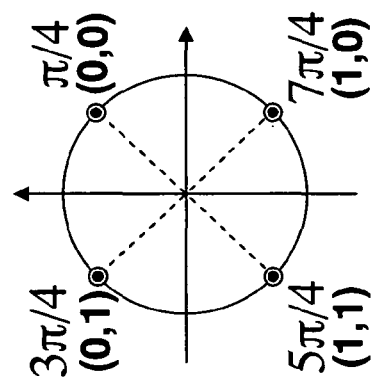
FIG. 2B is a diagram showing a relationship between a phase shift and data.

In the DQPSK, four kinds of phase differences different from one another by 90 degrees (p/2 radian) (for example, p/4, 3p/4, 5p/4, and 7p/4, that is, ±45 degrees and ±135 degrees) are used as phase differences relative to a preceding phase (for example, phase differences between adjacent symbols). Two-bit information is carried for each of the phase differences. For example, (0,0), (0,1), (1,1), and (1,0), each of which is two bits including an in-phase component (I component) and a quadrature component (Q component), can be assigned to the respective phased differences of p/4, 3p/4, 5p/4, and 7p/4 (see FIG. 2B).

According to the DQPSK receiver, two-bit information including the I component and the Q component, which corresponds to the phase difference between the symbols of the received DQPSK modulation signal can be demodulated based on the phase difference therebetween.

The interferometer control circuit 40 controls heating on the interferometers "A" and "B" based on a bit error rate (BER) and/or a code error rate, obtained from the framer/FEC decoder 32, thereby adjusting the phases of optical waveguides for the interferometers "A" and "B".

FIG. 2C shows an FSR of the interferometer "A" of the A-branch and an FSR of the interferometer "B" of the B-branch. FIG. 2D is a table showing a relationship between an intersymbol phase difference Δθ and each of currents (A-branch current and B-branch current) outputted from the CDR circuits 31A and 31B.

As shown in FIG. 2D, although an A-branch current value and a B-branch current value are changed according to the intersymbol phase difference, when the polarities of the currents are reversed if necessary in demodulation processing performed by the framer/FEC decoder 32, accurate data can be reproduced. For example, even in a case where Δθ is p/2, 3p/2, or 5p/2, when an A-current output and a B-current output which are equal to those in a case of Δθ=0 are to be obtained, an operation for reversing a sign of a branch current having a negative value in the case of each of p/2, 3p/2, and 5p/2 is executed by the framer/FEC decoder 32.

As shown in FIG. 2C, a phase difference of p/2 is provided between the FSR of the A-branch and the FSR of the B-branch. That is, the phase difference of p/2 is provided between the A-branch (interferometer "A") and the B-branch (interferometer "B"). With respect to the phase difference of p/2, for example, the DQPSK receiver is constructed to have the phase difference of p/2 at an intermediate wavelength of a use wavelength region used therein.

FIG. 3A is an explanatory plan view showing the interferometer module 10 and the light reception module 20, and FIG. 3B is an explanatory side view showing the interferometer module 10 and the light reception module 20 as shown in FIG. 3A.

As shown in FIG. 3A, the interferometer module 10 includes an input port for the DQPSK modulation signal, an optical splitter 11 for substantially uniformly Y-branching the DQPSK modulation signal inputted from the input port to two waveguides, and the interferometers "A" and "B" into which branch DQPSK modulation signals obtained by the optical splitter 11 are inputted. The input port is coupled with an optical fiber F (single mode) for transmitting the DQPSK modulation signal.

The interferometer "A" includes an optical splitter 12A for uniformly splitting the branch DQPSK modulation signal, an optical coupler (optical branch means) 13A, and two waveguides (arms) 14A and 14B provided between the optical splitter 12A and the optical coupler 13A. The arm 14A is constructed so as to be physically longer than the arm 14B. An optical signal flowing through the arm 14A is delayed by a delay time t corresponding to a symbol time relative to an optical signal flowing through the arm 14B. That is, a length of the arm 14A is set to provide the relative delay time t corresponding to the symbol time to the branch DQPSK modulation signal. The delay time is set so as to cause a phase difference of p/4 (radian) of the optical signal wavelength between the optical signals flowing through the arms 14A and 14B in the coupling portion (optical coupler 13A) of the interferometer "A".

The interferometer "B" has the same structure as that of the interferometer "A". In the interferometer "B", a delay time is set so as to cause a phase difference of −p/4 (radian) between optical signals on an arm 15A (long arm) and an arm 15B (short arm). An optical signal obtained by coupling (interference) in the optical coupler of each of the interferometers "A" and "B" is outputted from two output ports provided in each of the A-branch and the B-branch. The interferometer module 10 is constructed as a PLC chip (PCL type delay interferometer: PLC type interferometer main body) 10A based on a PLC technique. For example, the PLC chip 10A is constructed by forming an optical waveguide including a splitter and an optical coupler on a synthetic quartz glass substrate or a quartz substrate. The waveguide is made of quartz (Si), a Si material, lithium niobate (LiNbO3:LN), another semiconductor (GaAs, InP) material.

As described above, in this embodiment, the two interferometers "A" and "B" are constructed as the single PLC chip 10A. Therefore, a part size and the number of parts are reduced. In addition, the optical splitter 11 and the waveguides extended from the optical splitter 11 to the respective interferometers "A" and "B" are provided on the PLC chip 10A. Therefore, a step of connecting the optical splitter 11 with the respective interferometers "A" and "B" can be omitted.

In this embodiment, as shown in FIG. 3B, the PLC chip 10A is bonded (connected) to a Peltier element 51 serving as a first heating portion to each of the respective interferometers "A" and "B" through an intermediate member 52 sandwiched therebetween. That is, each of the PLC chip 10A, the intermediate member 52, and the Peltier element 51 is formed in a rectangular plate shape. The Peltier element 51, the intermediate member 52, and the PLC chip 10A are stacked in this order and bonded to one another.

A temperature sensor 53 for detecting a temperature of the PLC chip 10A and heaters 54A and 54B composing a second heating portion, for heating the arms 14A and 15A, respectively, of the interferometers "A" and "B" are attached on the PLC chip 10A. A thermistor or a resistance temperature detector (RTD) can be applied as the temperature sensor 53. A thin film heater or a microheater can be applied as each of the heaters 54A and 54B.

The Peltier element 51 heats the entire PLC chip 10A through the intermediate member 52. The respective heaters 54A and 54B can separately heat the vicinities of the arms 14A and 15A. In order to provide the delay times (for example, phase differences of p/4 and −p/4) corresponding to the wavelength of the DQPSK modification signal to the respective interferometers "A" and "B", the phase differences are controlled by the temperature adjustment by using the Peltier element 51 and the heaters 54A and 54B.

Here, assuming that the PLC chip 10A is directly bonded to the Peltier element 51, when the PLC chip 10A is heated by the Peltier element 51, refractive indexes of the waveguides of the interferometers "A" and "B" are changed by the thermal expansion of the PLC chip 10A. Therefore, there is a risk of shifting the phase differences (p/4 and −p/4) set between the arms, thereby increasing the polarization dependence (PDF). The intermediate member 52 is provided to prevent the deformation of the waveguides.

A material having a higher stiffness than that of the PLC chip 10A is selected for the intermediate member 52. This is because the stiffness is increased by bonding the PLC chip 10A to the material having the higher stiffness, thereby suppressing the deformation caused by heating. In order to adequately transfer heat from the Peltier element 51, a material having a high thermal conductivity is selected for the intermediate member 52. In order to prevent as much as possible a deformation stress of the intermediate member 52 which is caused by heating from being transferred as an external stress to the PLC chip 10A, a material in which a difference with the linear expansion coefficient of the PLC chip 10A is minimized is selected for the intermediate member 52.

In view of the conditions, an alloy, a mixture material ceramic and metal, or a gradient material can be applied for the intermediate member 52. The alloy which can be applied includes a superinvar (Fe (63%), Ni (32%), and Co (5%): linear expansion coefficient is $0.4 \times 10^{-6}/°$ C. and heat transfer rate (thermal conductivity) is 13.5 W/mK), an invar alloy (Ni(36%): linear expansion coefficient is $1.6 \times 10^{-6}/°$ C. and thermal conductivity is 13.4 W/mK), a kovar alloy (Ni (29%) and Co (17%): linear expansion coefficient is $5 \times 10^{-6}/°$ C. and thermal conductivity is 19.7 W/mK), a stainless invar (Co (54%) and Cr (9.5%): linear expansion coefficient is $0.4 \times 10^{-6}/°$ C. and thermal conductivity is 13.4 W/mK), and an Fe—Pd alloy (57Fe—43Pd: linear expansion coefficient is $1 \times 10^{-6}/°$ C.). Aluminum nitride can be applied for the intermediate member 52. An example in a case where the aluminum nitride is applied may be that quartz glass (linear expansion coefficient is $5 \times 10^{-7}/°$ C., and thermal conductivity is 1.5 W/mK) is applied to the PLC chip and an intermediate member made of aluminum nitride (linear expansion coefficient is $5 \times 10^{-6}/°$ C., and thermal conductivity is 90 W/mK or 170 W/mK) is applied, thereby setting a thermal conductivity difference therebetween to 88.5 W/mK or 168.5 W/mK.

The mixture material ceramic and metal which can be applied is a low thermal expansion cast iron (NEZTEC) (35%-Ni,C: linear expansion coefficient is $3.5 \times 10^{-6}/°$ C. and thermal conductivity is 17.3 W/mK)). Another member (intermediate member) located between the PLC chip and the Peltier element requires a material satisfying a condition in which a thermal conductivity difference therebetween is equal to or larger than 10 W/mK, and a linear thermal expansion coefficient difference therebetween is equal to or smaller than $4.5 \times 10^{-6}/°$ C. (for example, equal to or smaller than $1.6 \times 10^{-6}/°$ C.).

There is a thermal expansion gradient material obtained by stacking materials having different thermal expansion coefficients. A material having a positive thermal expansion coefficient and a material having a negative thermal expansion coefficient are simultaneously baked to reduce a linear expansion coefficient. For example, a gradient material as disclosed in JP 2005-89236 A can be applied.

The linear expansion coefficient of the PLC chip 10A is $5 \times 10^{-7}/°$ C., and the thermal conductivity of the PLC chip 10A is 1.5 W/mK (about room temperature). Therefore, a material (substance) satisfying a condition in which the linear expansion coefficient difference with the PLC chip 10A is $4.5 \times 10^{-6}/°$ C. and the thermal conductivity is equal to or larger than 10 W/mK is applied for the intermediate member 52 having the higher stiffness than that of the PLC chip 10A. The linear expansion coefficient difference is preferably $3 \times 10^{-6}/°$ C., more preferably $1 \times 10^{-6}/°$ C., further preferably $0.1 \times 10^{-6}/°$ C.

The intermediate member 52 is sandwiched (inserted) between the PLC chip 10A and the Peltier element 51, so the deformation of the PLC chip 10A which is caused by heat from the Peltier element 51 is suppressed. Therefore, an increase in PDF which is caused by a change of the refractive index of the waveguide is prevented.

When the structure is employed in which the intermediate member 52 is sandwiched between the PLC chip 10A and the Peltier element (first heating portion) 51 as described above, the structural condition in which the heaters 54A and 54B are placed on the PLC chip 10A and the two interferometers "A" and "B" are provided in the PLC chip 10A is not essential.

In the example, p/4 and −p/4 are applied as a combination of the phase differences for the interferometers "A" and "B" (A-branch and B-branch) for demodulating the DQPSK modulation signal to the intensity-modulated signal. Note that there are the following eight combination patterns of the phase differences.
(1) A-branch=45 degrees (p/4 radian), B-branch=−45 degrees (−p/4 radian)
(2) A-branch=−135 degrees, B-branch=−45 degrees
(3) A-branch=−135 degrees, B-branch=135 degrees
(4) A-branch=45 degrees, B-branch=135 degrees
(5) A-branch=−45 degrees, B-branch=−135 degrees
(6) A-branch=135 degrees, B-branch=−135 degrees
(7) A-branch=−45 degrees, B-branch=45 degrees
(8) A-branch=135 degrees, B-branch=45 degrees Each of data (0/1) recognized by a recognition circuit (demodulation section) of the receiver is changed depending on a combination pattern in some cases. When processing for reproducing transmitted data from output data of the recognition circuit is suitably changed, the transmitted data can be accurately produced. Therefore, in the embodiment, a target phase value of the A-branch is "p/4" and a target phase value of the B-branch is "−p/4". However, the present invention is not limited to this combination. That is, according the present invention, a structure can be employed in which the phase difference for one interferometer and the phase difference for the other interferometer become a combination of predetermined values.

Figure 4:
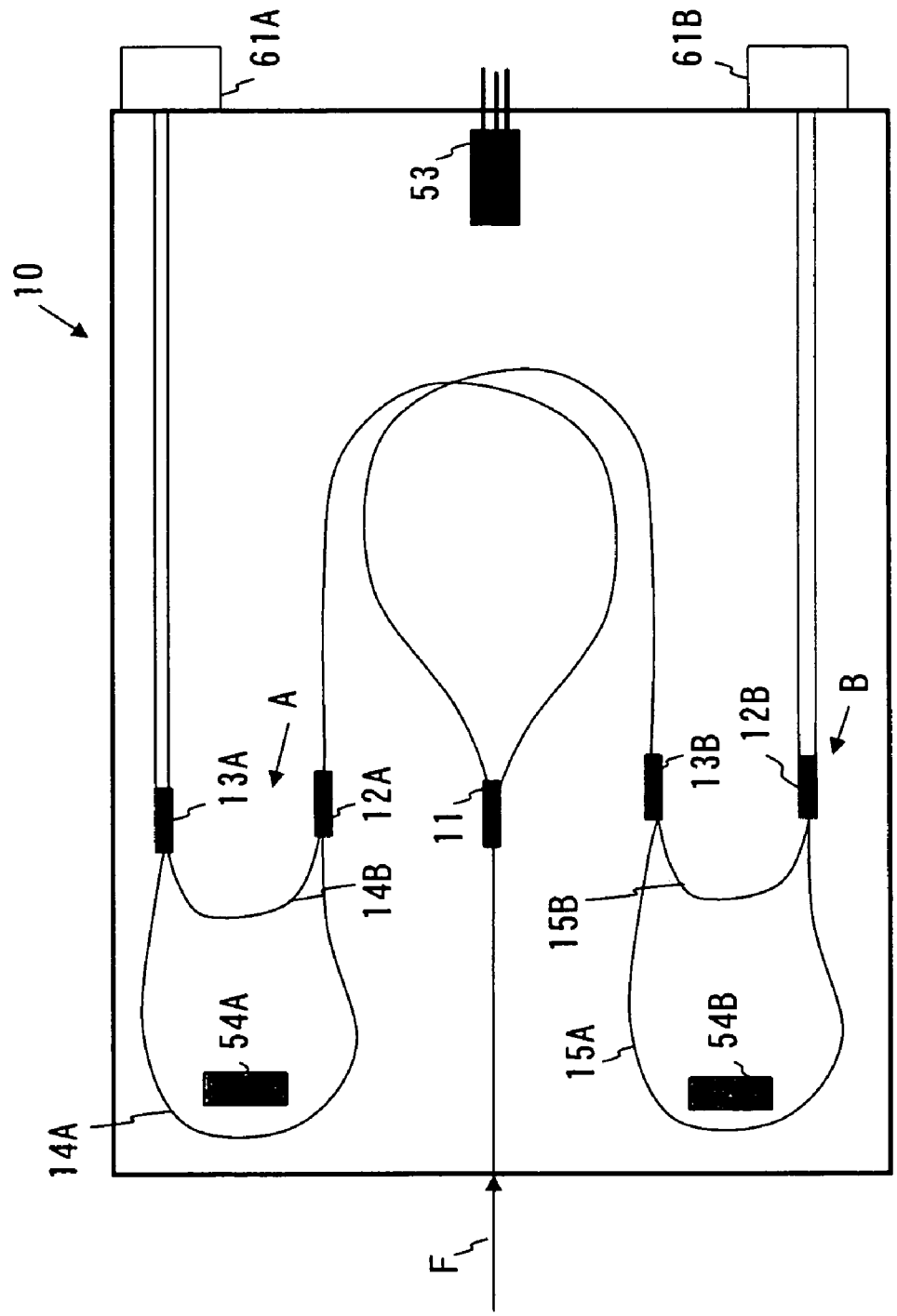
FIG. 4 is a plan view showing a physical arrangement example of constituent elements of the interferometer module as shown in FIG. 3A.

FIG. 4 is a plan view showing a physical arrangement example of constituent elements of the interferometer module 10 as shown in FIG. 3A. As shown in FIG. 4, the interferometers "A" and "B" are arranged at an interval. The arms of each of the interferometers "A" and "B" are arranged at an interval. The heaters 54A and 54B are located near the long arms 14A and 15A. Therefore, heat from each of the heaters 54A and 54B is not transferred to the other interferometer (thermal crosstalk does not occur). In order to prevent heat transferred to the arm 14A (15A) from being transferred to the arm 14B (15B), the heater 54A (54B) and the arm 14B (15B) are provided at an interval.

The description returns to FIGS. 3A and 3B. An optical system for guiding light beams exited from the interferometers "A" and "B" to the A-side light reception module 20A and the B-side light reception module 20B is provided between the interferometer module 10 and the light reception module (balanced photo detector) 20.

The optical system includes GRIN lenses (SELFOC lenses) 61A and 61B and flat lenses 62A and 62B disposed in the subsequent stage of the GRIN lenses 61A and 61B, which are provided corresponding to the A-branch and the B-branch.

Each of the GRIN lenses 61A and 61B is bonded to an end surface of the PLC chip 10A and coupled to the two output ports of a corresponding interferometer. On the other hand, each of the flat lenses 62A and 62B are disposed coaxial with a corresponding GRIN lens and supported by a lens holder 63 provided in a box-shaped case 65 of the light reception module 20A (20B).

The structure of the A-side light reception module 20A and the structure of the B-side light reception module 20B are identical to each other. The B-side light reception module 20B will be described as an example. The B-side light reception module 20B has a light reception window 64B for transmitting an optical signal passing through the flat lens 62B. The case 65 for the light reception module includes the photoelectric conversion section 21B and the amplifier 22B which are located therein. In order to maintain the performance of semiconductor elements, the inside of the case 65 is airtightly sealed (hermetically sealed) by welding after nitrogen gas filling.

Figure 5:
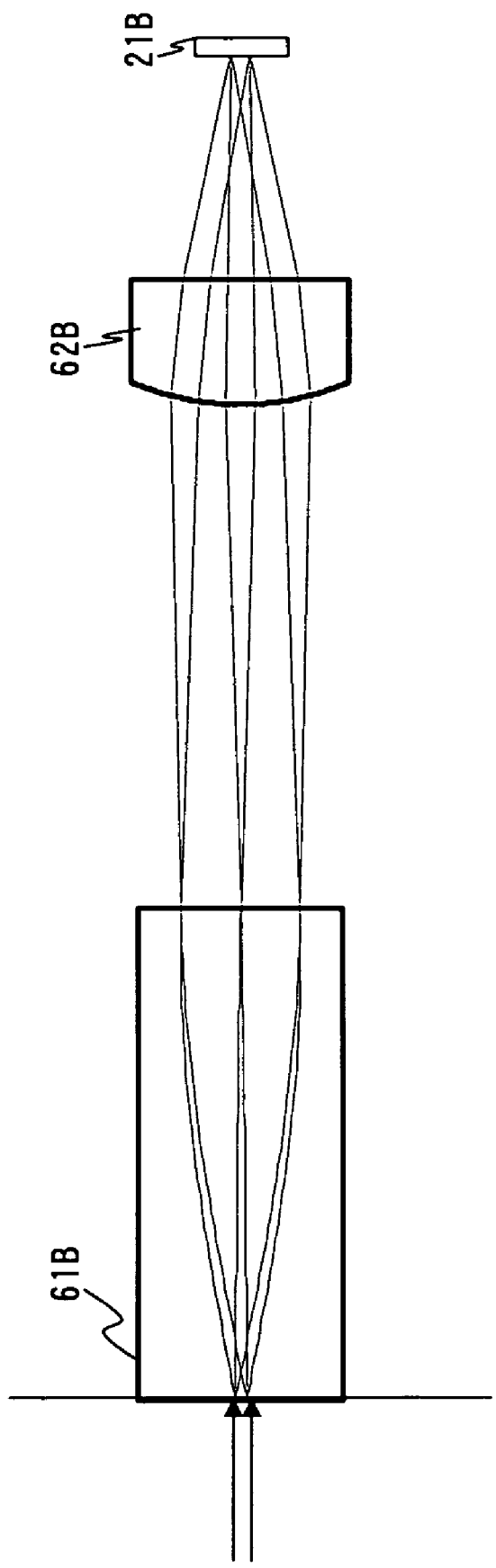
FIG. 5 is a view showing an optical path (light beam) of an optical system corresponding to the B-branch which is a representative of the A- and B-branches.

FIG. 5 is a view showing an optical path (light beam) of an optical system corresponding to the B-branch which is a representative of the A- and B-branches. Light beams exited from the optical coupler 13B of the interferometer "B" are incident on the GRIN lens 61B through the two output ports. The GRIN lens 61B radially refracts the incident light beams. The light beams incident on the GRIN lens 61B through the two output ports become parallel beams while being diffused, and then are exited from an output end of the GRIN lens 61B.

Each of the exited parallel beams is incident on the flat lens (condensing lens) 62B. The flat lens 62B condenses each of the incident light beams. Each of the light beams exited from the flat lens 62B passes through the light reception window 64B and forms an image on each PD of the photoelectric conversion section 21B at a focus position thereof.

As described above, in this embodiment, the GRIN lenses 61A and 61B are attached onto the end surface of the PLC chip 10A. The GRIN lens has a flat opening portion. Therefore, it is unnecessary to refract light in the opening portion, aberration is low, and a focal length and an N.A. value are suitable for use in a collimator lens. Thus, the attachment and adjustment are easier than those of an aspherical lens or a microlens.

If the aspherical lens is to be applied, it is necessary to consider coma aberration and the like. When light beams exited from a plurality of output ports (waveguides) are to be collimated by the single aspherical lens, it is necessary to set a large opening diameter. An opening portion of the aspherical lens is not flat, so an additional aspherical lens support mechanism (attachment mechanism) is required, thereby increasing a size of the receiver.

If the microlens is to be applied, there is a problem in that it is necessary to increase the opening diameter as in a case of the aspherical lens when light beams exited from a plurality of waveguides are to be collimated by the single microlens. In view of this, when a plurality of microlenses (microlens arrays) are used corresponding to the respective exit light beams, each of the exit light beams is collimated by a microlens. Therefore, it is necessary to use a microlens as the condensing lens. In this case, it is required that an optical alignment of the microlens serving as the condensing lens is made with high precision. Thus, the alignment of the entire optical system (optical coupling system) becomes very complicated.

In this embodiment, the GRIN lens which is easily attached and adjusted is directly bonded to the PLC chip 10A. Therefore, the size of the receiver and the number of parts (including the number of lenses) can be reduced as compared with a case where another lens is used. The attachment and adjustment are easy so the manufacturing process is facilitated. That is, a manufacturing cost can be reduced.

As shown in FIG. 3B, the interferometer module 10 and the light reception module 20 are positioned on an identical board (base plate) 71 and fixed thereon. In this time, the positions of the interferometer module 10 and the light reception module 20 relative to the board 71 are determined such that four optical path lengths of optical signals which are provided therebetween are equal to one another (respective optical signals simultaneously reach the respective photoelectric conversion sections 21A and 21B). Therefore, it can be prevented that light reception timings of the optical signals in the light reception module 20 are shifted from one another to cause data reproduction error.

As described above, in the interferometer module 10, the two interferometers "A" and "B" composes the single PLC chip. Therefore, the attachment (positioning) of the interferometer module 10 to the board 71 is facilitated.

As described above, in this embodiment, a phase difference of approximately p/2 is provided as a relative phase difference between the waveguide of the interferometer "A" and the waveguide of the interferometer "B". The relative phase difference may be an odd multiple of p/2. The relative phase difference is provided in advance, for example, by a method of physically changing the waveguide length between the interferometers "A" and "B". Then, when the temperatures of the interferometers "A" and "B" are made substantially equal to each other during the phase control based on temperature, the phase adjustment can be performed, so the power consumption can be suppressed.

Figure 6:
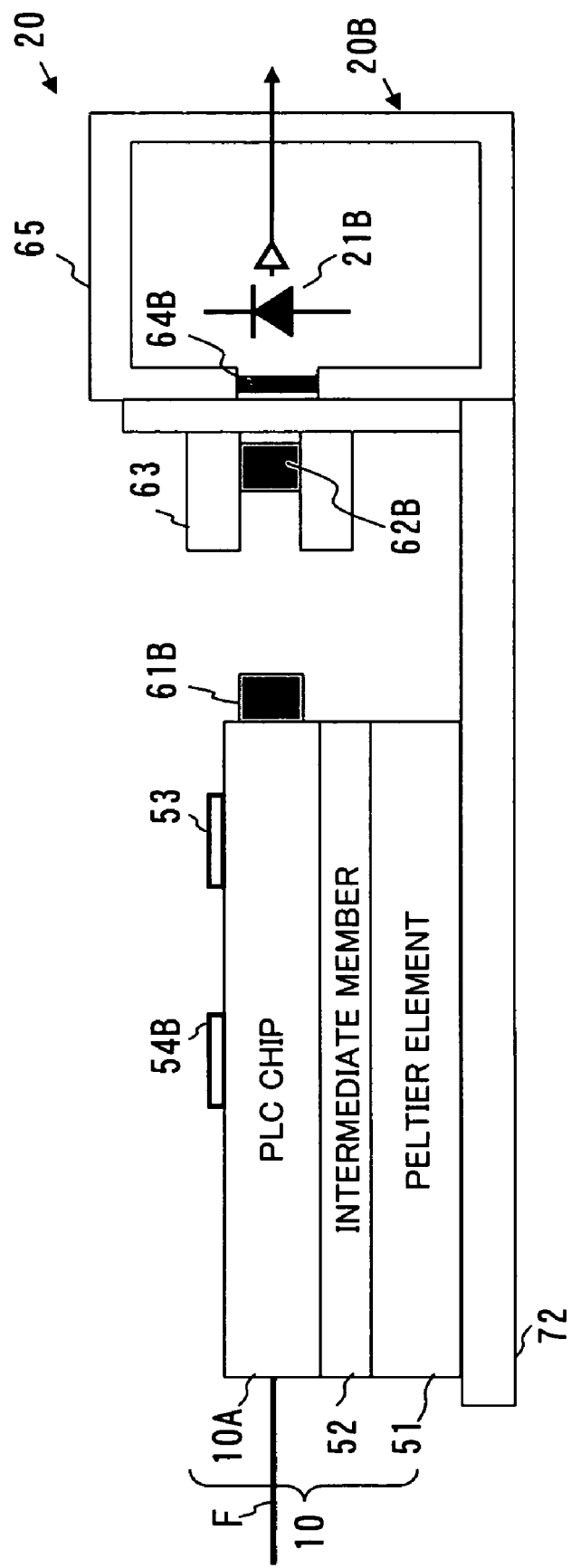
FIG. 6 is a diagram showing a modified example of the structural example shown in FIG. 3B.

As shown in FIG. 6, an L-shaped member (for example, L-shaped hardware) 72 formed at a right angle may be used instead of the board 71. In this structure, the interferometer module 10 is located on an upper surface of the L-shaped member 72. A flat surface of the case of the light reception module 20 on which the lens holder 63 is provided is attached to one of elevation surfaces (flat surfaces) of the L-shaped member 72 in a state in which the lens holder 63 extends therethrough.

The description returns to FIGS. 3A and 3B. According to the interferometer module 10 in this embodiment, the heaters 54A and 54B composing the second heating portion are provided on the PLC chip 10A. The Peltier element 51 heats the entire PLC chip 10A to perform the phase adjustment, so the fine phase adjustment cannot be performed. The heaters 54A and 54B are provided to heat the vicinities of the waveguides of the respective branches, thereby performing the fine phase adjustment for each branch, which cannot be performed by only the Peltier element 51.

The phase adjustment of the interferometers "A" and "B" is performed by using the Peltier element 51 and the heaters 54A and 54B. The operations of the Peltier element 51 and the heaters 54A and 54B are controlled by the interferometer control circuit 40 (FIG. 2A). Hereinafter, when the heater 54A is not distinguished from the heater 54B, the heater is expressed as a heater 54.

Figure 7B:
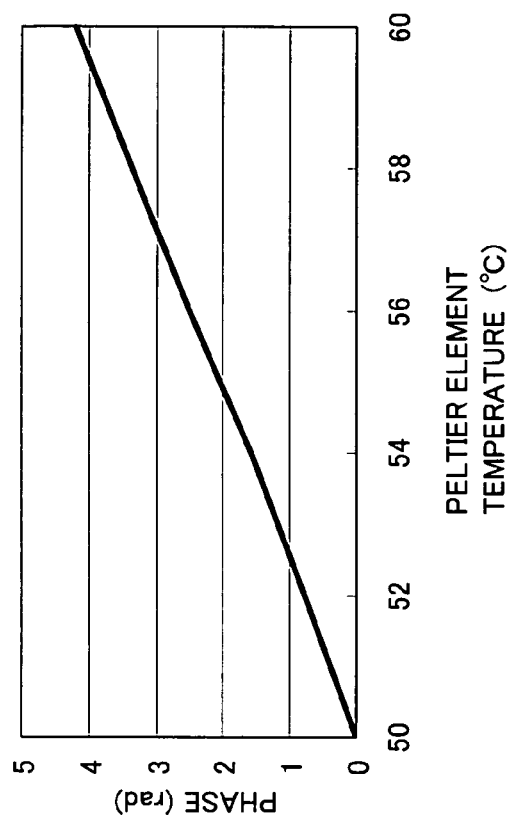
FIG. 7B is a graph showing an example of the amount of phase varied by a Peltier element.
Figure 7A:
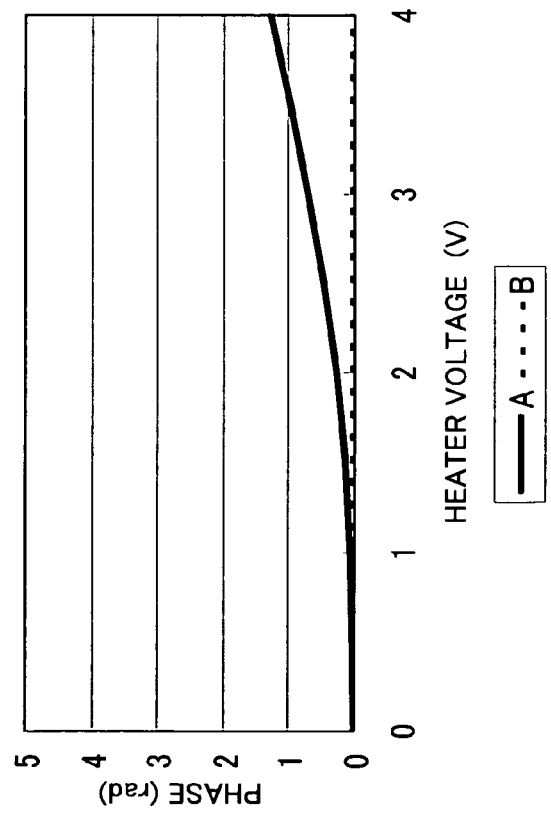
FIG. 7A is a graph showing an example of the amount of phase varied by a heater.

The amount of phase variation is changed between the heater 54 and the Peltier element 51. FIG. 7A is a graph showing an example of the amount of phase varied by the heater 54. FIG. 7B is a graph showing an example of the amount of phase varied by the Peltier element 51. In the heater 54, the amount of phase variation is approximately 1.2 radians in an applied voltage range over 0 V to 4 V. In contrast to this, in the Peltier element 51, the amount of phase variation per 1° C. is 24°.

In order to deal with any signal phases in the interferometer phase control, the amount of phase variation which is equal to or larger than p/2 radians is necessary. The thin film heater or the microheater is applied as the heater 54, so a maximum value of an applied voltage is limited. As shown in FIG. 8, when a temperature (applied voltage) of one heater 54 (for example, heater 54A) is increased while a current applied to the Peltier element 51 is held constant, heat is transferred to an adjacent interferometer (for example, interferometer "B"), thereby causing the influence in which the phase in the interferometers "A" changes (thermal crosstalk).

In the Peltier element 51, the amount of phase variation can be widened by changing the temperature of the entire interferometer (PLC chip 10A). Although the Peltier element 51 can perform rough phase adjustment, it cannot perform fine adjustment. Therefore, the interferometer control circuit 40 performs the following control.

The interferometer control circuit 40 is connected with the temperature sensor 53 and connected with the Peltier element 51 and the heaters 54A and 54B through a current supply line (not shown). In addition, the interferometer control circuit 40 is connected with the framer/FEC decoder 32 to receive the BER and/or the core error rate from the framer/FEC decoder 32.

The interferometer control circuit 40 has a target value of the BER and/or a target value of the core error rate. In order that the BER and/or the core error rate become the target value, the amount of current applied to the Peltier element 51 and the amount of voltage applied to the heater 54 are adjusted while the temperature is monitored based on the output from the temperature sensor 53, thereby adjusting the phases of each branch.

Figure 9:
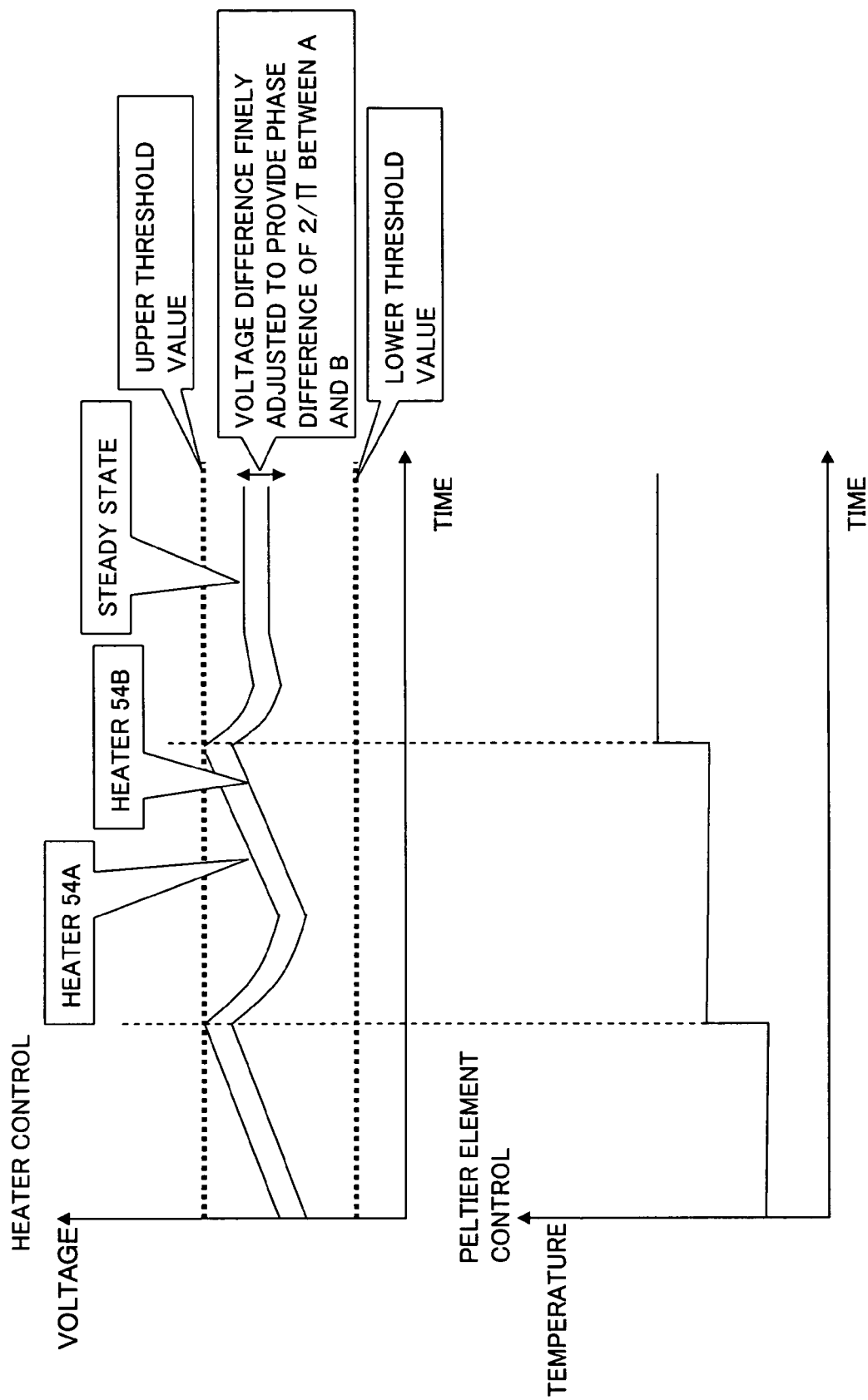
FIG. 9 is a graph showing an example of control made by an interferometer control circuit (phase control section)

FIG. 9 shows an example of control made by the interferometer control circuit (phase control section) 40. The interferometer control circuit 40 monitors voltage values applied to the respective heaters 54A and 54B. The voltage values applied to the heaters 54A and 54B are different from each other to provide the phase difference of p/2 between the A-branch and the B-branch. An upper threshold value and a lower threshold value are set for each of the voltage values applied to the heaters 54A and 54B.

As shown in FIG. 9, for example, when the voltage value applied to the heater 54A reaches the upper threshold value, the temperature of the Peltier element 51 is increased by a predetermined amount. On the other hand, the voltage value applied to each of the heaters 54A and 54B is reduced to, for example, each initial value. After that, when the voltage value applied to the heater 54A reaches the upper threshold value again, the same operation is performed. On the other hand, when the voltage value applied to the heater 54B reaches the lower threshold value, the reverse operation (the temperature of the Peltier element 51 is increased and the temperature of the heater 54 is reduced) is performed.

As described above, the rough temperature control is performed by using the Peltier element 51 and the fine adjustment is performed by using the heater 54, so the fine phase adjustment is possible. FIG. 10 shows a penalty (Q value) in a case of phase adjustment using only the Peltier element 51, and a penalty in a case of phase adjustment using the Peltier element 51 and the heater 54. The penalty in a case of control using the Peltier element and the heater is improved by approximately 0.5 dB as compared with the case of control using only the Peltier element.

In this embodiment, the DQPSK receiver is described. However, the structure described in this embodiment can be also applied to a receiver (demodulation (reproduction) device)) for a differential M (in this embodiment, M=4, where M=2n (n is natural number))-phase shift keying signal. In addition, the structure including the interferometer module, the light reception module, and the optical system as described in this embodiment can be applied to a receiver for not only the DPSK modulation signal but also a PSK modulation signal.

[Others]

The embodiment discloses the following aspects of the present invention. The aspects of the present invention recited in claims can be suitably combined if necessary.

The disclosures of Japanese patent application No. JP2006-019607 filed on Jan. 27, 2006 including the specification, drawings and abstract are incorporated herein by reference.

What is claimed is:

1. An interferometer for demodulating a differential M-phase shift keying signal comprising:
  a planar lightwave circuit (PLC) type interferometer main body;
  a first heating portion that heats the PLC type interferometer main body;
  an intermediate member which has a higher stiffness than that of the PLC type interferometer main body and is bonded to the PLC type interferometer main body and the first heating portion while being sandwiched between the PLC type interferometer main body and the first heating portion;
  a second heating portion located adjacent to an optical waveguide included in the PLC type interferometer main body, wherein
  phase adjustment of the differential M-phase shift keying signal flowing through the PLC type interferometer main body is performed by a temperature control using the first heating portion, and
  phase adjustment finer than that made by using the first heating portion is performed by a temperature control using the second heating portion.

2. An interferometer for demodulating a differential M-phase shift keying signal, comprising:

a planar lightwave circuit (PLC) type interferometer main body including two interferometers in which a differential M-phase shift keying signal is inputted, wherein a phase difference of an odd multiple pi/2 (radians) is provided between the two interferometers;

a first heating portion that heats the PLC type interferometer main body;

an intermediate member which has a higher stiffness than that of the PLC type interferometer main body and is bonded to the PLC type interferometer main body and the first heating portion while being sandwiched between the PLC type interferometer main body and the first heating portion; and a second heating portion located adjacent to an optical waveguide included in each of the two interferometers, wherein phase adjustment of the differential M-phase shift keying signal flowing through the PLC type interferometer main body is performed by a temperature control using the first heating portion, and phase adjustment finer than that made by using the first heating portion is performed by a temperature control using the second heating portion.

* * * * *